UNITED STATES PATENT OFFICE.

WILLIAM ARTHUR CALDECOTT, OF JOHANNESBURG, SOUTH AFRICAN REPUBLIC.

METHOD OF EXTRACTING GOLD FROM CYANID.

SPECIFICATION forming part of Letters Patent No. 620,100, dated February 28, 1899.

Application filed January 31, 1898. Serial No. 668,668. (No specimens.)

*To all whom it may concern:*

Be it known that I, WILLIAM ARTHUR CALDECOTT, analytical chemist, a citizen of and a resident of Johannesburg, Transvaal, South African Republic, have invented certain new and useful Improvements in Methods of Extracting Gold from Cyanid Solutions Containing the Precious Metals, of which the following is a specification.

This invention relates to methods of extracting gold from cyanid solutions containing the precious metals; and the object of my improvement is to simplify and cheapen the methods heretofore devised.

I place zinc-shavings in a launder or box and add a solution of perchlorid of mercury ($HgCl_2$) or other similar mercury salt for a short time. I find that the best results are obtained by adding a solution containing two parts of perchlorid of mercury ($HgCl_2$) in weight to every hundred parts of zinc-shavings, in weight.

By passing the cyanid solution containing gold over the zinc-shavings treated as above mentioned I find that I can extract nearly all the gold, irrespective of the amount there may have been in solution.

Zinc-shavings treated with perchlorid of mercury or other soluble salt of mercury are more efficient than ordinary zinc-shavings, in that the mercury having been deposited in a finely-divided porous form on the surface of the zinc galvanic action is set up by the zinc mercury couple, consisting of two dissimilar metallic elements in close proximity in the exciting cyanid solution, which causes more rapid precipitation of the gold than if ordinary zinc-shavings alone were used.

I am aware that an amalgam of zinc and mercury has been used with a similar object; but what I claim is the particular method above described, as being cheaper and simpler.

Having described my invention, what I claim as new, and desire to secure by Letters Patent, is—

As an improved method for the precipitation of gold from solutions containing gold-bearing cyanid solutions, the passing of such solutions over zinc shavings previously treated with a soluble salt of mercury, as perchlorid of mercury, as described.

Signed at Johannesburg, Transvaal, South Africa, this 3d day of December, 1897.

WILLIAM ARTHUR CALDECOTT.

Witnesses:
   GEO. MCDOUGALL,
   WM. WIXING.